US011153109B2

(12) United States Patent
Kwatra et al.

(10) Patent No.: US 11,153,109 B2
(45) Date of Patent: Oct. 19, 2021

(54) INTELLIGENT TELECONFERENCE OPERATIONS IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Shikhar Kwatra, Durham, NC (US); Peeyush Jaiswal, Boca Raton, FL (US); Priyansh Jaiswal, Boca Raton, FL (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 16/102,613

(22) Filed: Aug. 13, 2018

(65) Prior Publication Data

US 2020/0052920 A1   Feb. 13, 2020

(51) Int. Cl.
*H04L 12/18* (2006.01)
*H04L 29/06* (2006.01)
*G10L 15/183* (2013.01)
*G06N 20/00* (2019.01)

(52) U.S. Cl.
CPC ........ *H04L 12/1818* (2013.01); *G06N 20/00* (2019.01); *G10L 15/183* (2013.01); *H04L 65/1083* (2013.01); *H04L 65/1096* (2013.01)

(58) Field of Classification Search
CPC ............ H04L 12/1818; H04L 65/1083; H04L 12/1822; H04M 3/56; H04M 2203/5009; H04M 2203/5027
USPC .................................................. 379/202.01
See application file for complete search history.

(56) References Cited

U.S. PATENT DOCUMENTS

| | | | |
|---|---|---|---|
| 8,483,375 B2* | 7/2013 | Dhara | H04L 12/1818 370/260 |
| 9,602,558 B2* | 3/2017 | Bhan | H04L 65/403 |
| 9,614,968 B2 | 4/2017 | Adderly et al. | |
| 9,614,977 B1 | 4/2017 | Bond et al. | |
| 9,621,731 B2 | 4/2017 | Bostick et al. | |
| 9,635,061 B2 | 4/2017 | McCormack et al. | |
| 2011/0270922 A1* | 11/2011 | Jones | G06F 3/0486 709/204 |
| 2014/0188541 A1 | 7/2014 | Goldsmith et al. | |
| 2014/0222907 A1 | 8/2014 | Seligmann et al. | |
| 2014/0289326 A1 | 9/2014 | McCormack et al. | |
| 2015/0179186 A1 | 6/2015 | Swierk et al. | |
| 2016/0283909 A1* | 9/2016 | Adiga | G06Q 10/1095 |
| 2018/0176713 A1* | 6/2018 | Linsky | H04M 1/6033 |
| 2020/0028884 A1* | 1/2020 | Childers | H04L 65/1083 |

* cited by examiner

*Primary Examiner* — Ahmad F. Matar
*Assistant Examiner* — Jirapon Intavong
(74) *Attorney, Agent, or Firm* — Griffiths & Seaton PLLC

(57) ABSTRACT

Embodiments for intelligent teleconference operations in an Internet of Things (IoT) computing environment by a processor. A communication connection for a conference call session may be cognitively initiated or terminated with one or more users according to one or more parameters associated with a user profile, a schedule of the one or more users, activities of daily living ("ADL"), one or more contextual factors, or a combination thereof.

17 Claims, 7 Drawing Sheets

INTELLIGENT TELECONFERENCE OPERATIONS IN AN INTERNET OF THINGS (IOT) COMPUTING ENVIRONMENT

BACKGROUND OF THE INVENTION

Field of the Invention

The present invention relates in general to computing systems, and more particularly, to various embodiments for implementing intelligent teleconference operations in an Internet of Things (IoT) computing environment using a computing processor.

Description of the Related Art

Computing systems may be found in the workplace, at home, or at school. In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continue to engender the sharing of a vast amount of information between people.

SUMMARY OF THE INVENTION

Various embodiments for implementing intelligent teleconference operations in an Internet of Things (IoT) computing environment by a processor are provided. In one embodiment, by way of example only, a method for intelligent notification during a conference call in an Internet of Things (IoT) computing environment, again by a processor, is provided. Embodiments for intelligent teleconference operations in an Internet of Things (IoT) computing environment by a processor. A communication connection for a conference call session may be cognitively initiated or terminated with one or more users according to one or more parameters associated with a user profile, a schedule of the one or more users, activities of daily living ("ADL"), one or more contextual factors, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
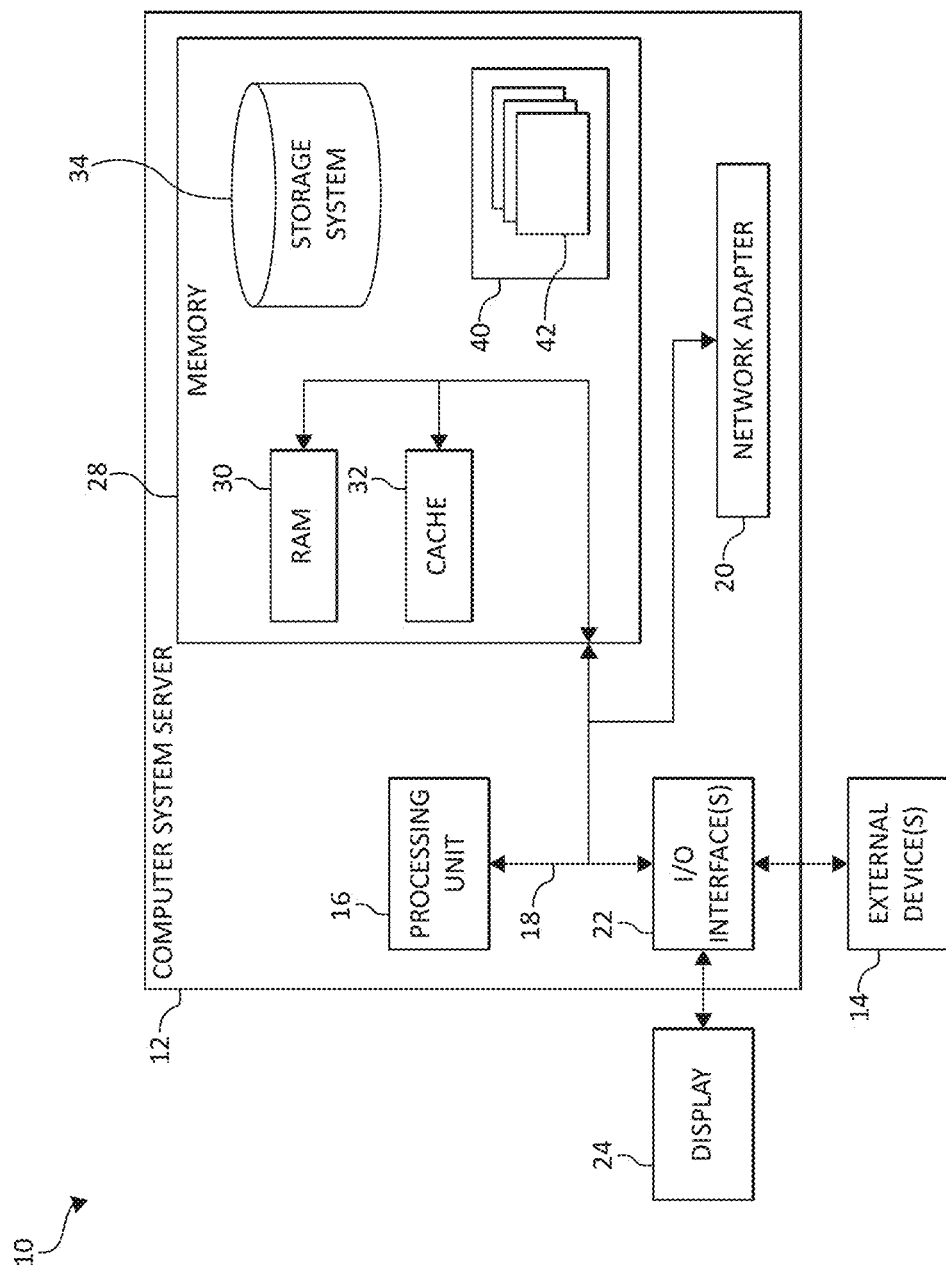
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, the advent of immediate, real-time communication enables various user equipment ("UE") such as, for example, a computing device/wireless communication device (e.g., the IoT device) to share communications, such as conference calls (e.g., audio and/or video conference calls), messages, chat messages, emails, speeches, social media posts, and other content to a variety of other users. More specifically, when a user is required to dial a number to access a communication bridge connection, the user may be required to first check the data source (e.g., a calendar, email, etc.), open the bridge connection, and then join the conference call. Also, when the conference call is concluded, one or more persons may hang up on the conference call, which may directly terminate/turn off the communication (for all parties intentionally or accidently). Thus, a need exists for improving and providing a more efficient manner for telecommunication operations and access for one or more users.

Accordingly, the present invention provides for implementing intelligent teleconference operations for an event (e.g., a conference all) in an IoT computing environment. The mechanisms of the illustrated embodiments provide that a communication connection (e.g., conference call bridge) for a conference call session may be cognitively initiated with one or more users according to one or more parameters associated with a user profile, a schedule of the one or more users, activities of daily living ("ADL"), one or more contextual factors, or a combination thereof.

In an additional aspect, a user's schedule may be analyzed and activities of daily living ("ADL") (e.g., calendar data, location data of the user, daily calls sent/received, etc.) may be monitored. Simultaneous, priority levels between a current activity and the teleconference call may be analyzed and determined. For example, if a system identifies a user is driving a vehicle (or other activity), the user may not be automatically connected with the conference call bridge according to one or more user preferences or defined parameters. As an additional example, one or more wearable (IoT) devices may have detected that the user of the UE has become ill or not feeling well and is currently resting. In this scenario, the present may or may not automatically connect a user with the conference call bridge.

Additionally, the present invention may determine that a user is currently engaged in an activity that may be ranked, defined, and/or categorized as more important than a scheduled conference call. Thus, the present invention may or may not automatically connect a user with the conference call bridge upon determining a prioritized activity is completed and there is no other comparative priority is the near future (e.g., system detects via one or more IoT devices or global positioning satellite ("GPS") operations the user is about cross a busy intersection/or road in next 2 minutes and does not connect the user for safety reasons even though the user is currently available).

In one aspect, the present invention provides for automatically connecting (e.g., dial into) to a current conference call (e.g., audio and/or visual conference call) according to one or more organized meetings. A determination may be performed to determine when a user joins the teleconference call and/or leaves/exits the teleconference call. In an additional embodiment, the present invention may also estimate, determine, or learn that one or more users have left the conference call according to a period of silence that exceeds a threshold. As used herein, a "conference call" or "teleconference call" may be any communication between one or more persons using one more computing devices (e.g., wireless communication devices, Internet of Things "IoT" devices). For example, a conference call may include, but not limited to, audio conference calls, video conference calls, web conference, teleconferencing, and the like.

The teleconference call may be ended or terminated upon the selected time period of silence of the conference call session exceeding a threshold, one or more keywords have been identified, voice recognition data of the one or more users have been identified during the conference call, and/or a combination thereof. Said differently, once the conference call session exceeds a threshold the teleconference call may be terminated based on a scheduled meeting time and/or based on speculating keywords and voices being heard on the conversation. For example, there may be instances when persons say speculating keywords such as, for example, "bye" or "talk to you later" but forget to hang up or terminate the call. These speculating keywords refer to keywords or phrases where the monitoring system decides to automatically terminate the conversation and hanging up the phone upon detection of the speculating keywords. In an additional example, both the time and the duration of the meeting may be monitored. Upon determining there is no person talking for a selected amount of time, the meeting may be determined as being over or completed and the phone call may be hung up/terminated according to a specific timer polling.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
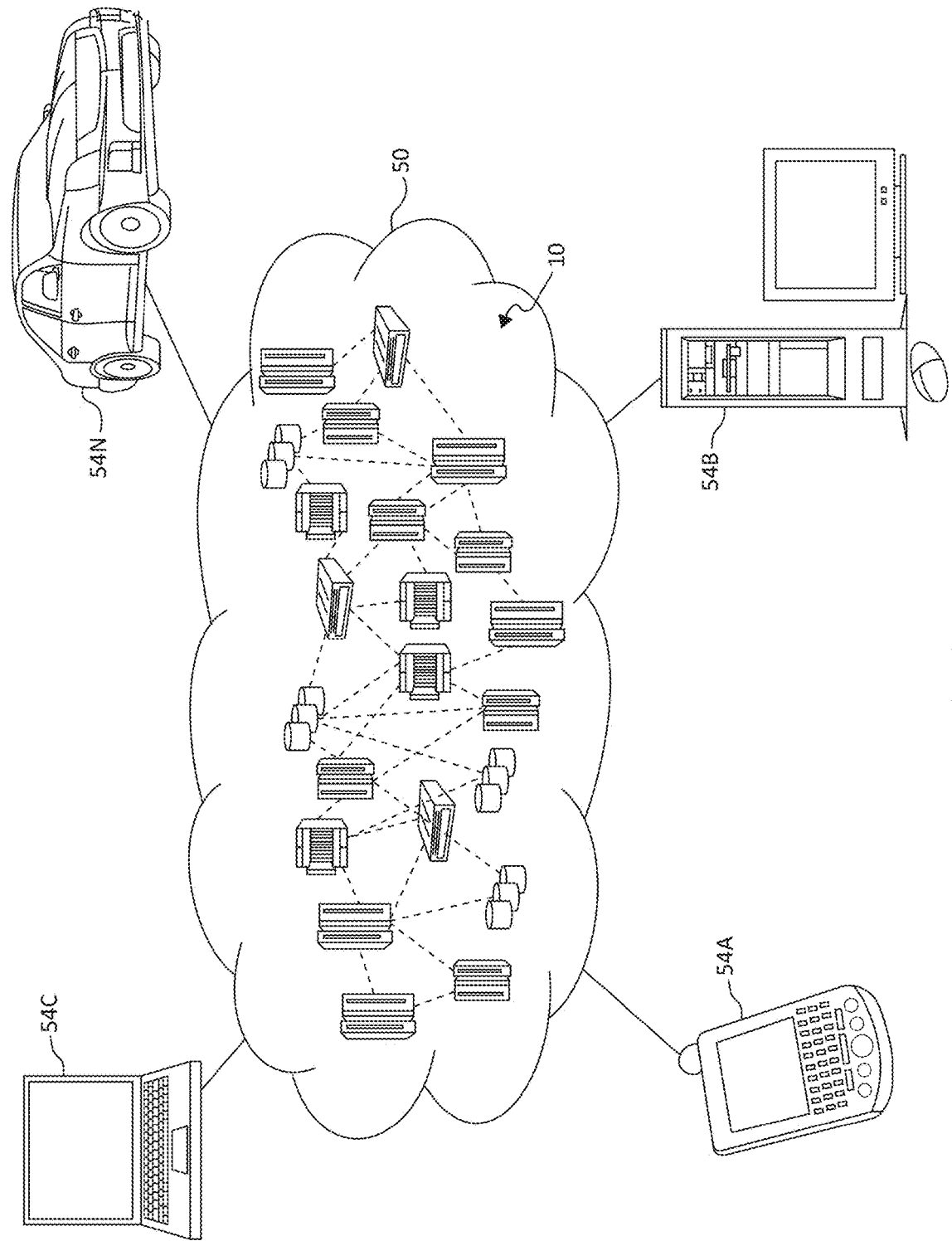
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
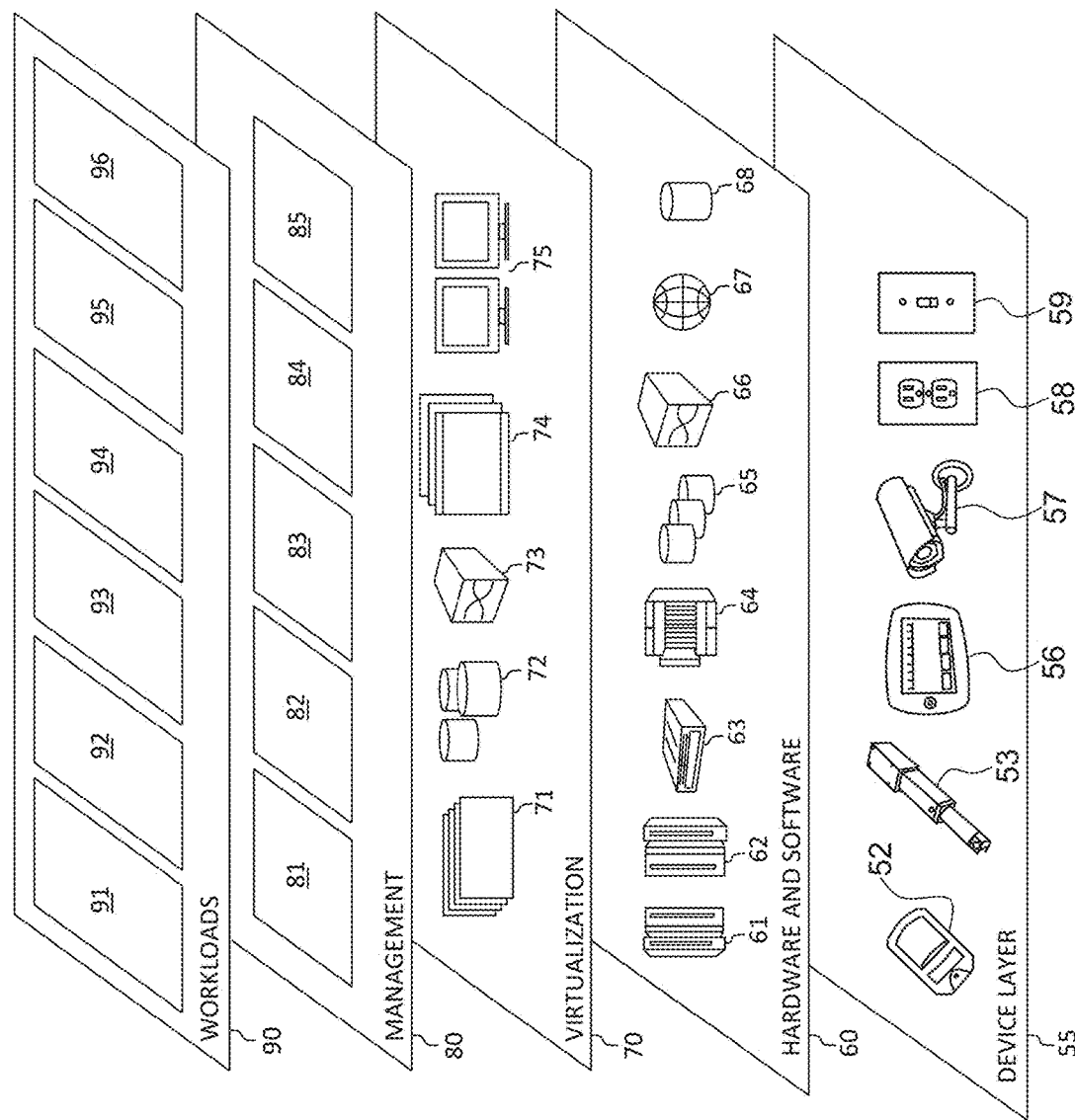
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent teleconference operations. In addition, workloads and functions 96 for intelligent teleconference operations may include such operations as data analysis, data authentication and identification, device identity/attribute analysis, user identity/attribute analysis, and as will be further described, user and device management functions. One of ordinary skill in the art will appreciate that the workloads and functions 96 for intelligent teleconference operations may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
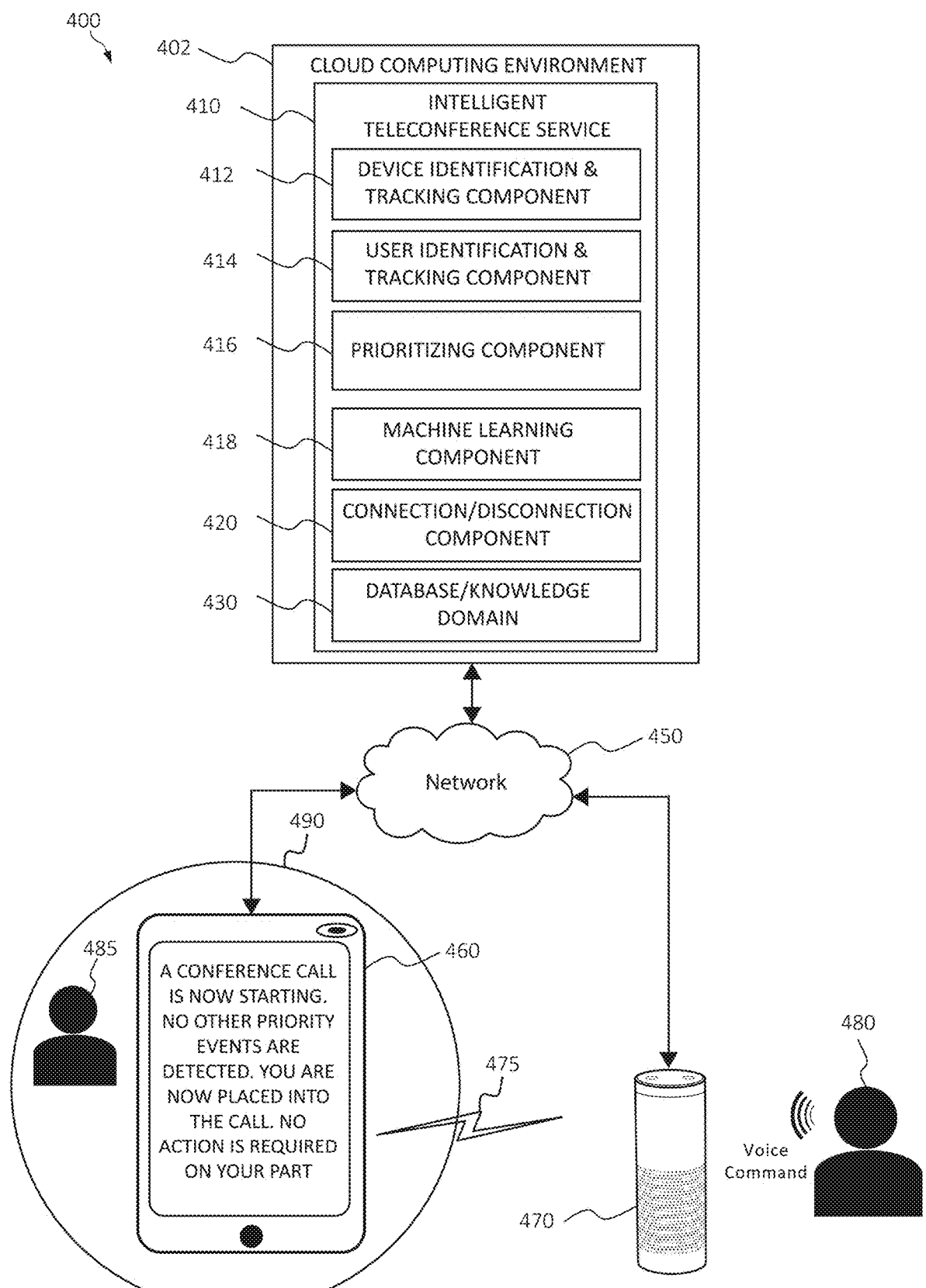
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for intelligent teleconference operations in an IoT computing environment, such as a computing environment 402 (e.g., a cloud computing environment), according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent teleconference operations in accordance with the present invention. Many of the functional blocks 400 may execute as background processes on various components, either in distributed computing components, or on the user device, or elsewhere.

d

The system 400 may include the cloud computing environment 402, an intelligent teleconference service 410, one or more IoT devices 470 (e.g., a digital assistant), and one or more devices such as, for example, device 460 (e.g., a desktop computer, laptop computer, tablet, smartphone, and/or another wireless communication device that may have one or more processors and memory). The device 460, the IoT device 470, the intelligent teleconference service 410, and the computing environment 402 may each be associated with and/or in communication with each other, by one or more communication methods, such as a computing network 450. In one example, the device 460, the IoT device 470, the intelligent teleconference service 410, and the computing environment 402 may be controlled by an owner, customer, or technician/administrator associated with the computing environment 402. In another example, the device 460, the IoT device 470, the intelligent teleconference service 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to device 460 and/or the IoT device 470. More specifically, the computing environment 402 may provide virtualized computing, virtualized storage, virtualized networking and other virtualized services that are executing on a hardware substrate. In one aspect, the one or more IoT device 470 may communicate with the device 460 using network 450. Also, the one or more IoT device 470 may communicate with the device 460 using one or more communication connections such as, for example, a Wi-Fi Internet connection 475.

As depicted in FIG. 4, the computing environment 402 may include the intelligent teleconference service 410. The intelligent teleconference service 410 may also function as a database and/or service that may store, maintain, and update data, services, and/or resources internal to and/or external to the cloud computing environment 402. The intelligent teleconference service 410 may store, maintain, and update device identification and authorization information and/or biometric identification (ID) data associated with a device and one or more user profiles, such as, for example, voice data, fingerprint data, and/or retinal data, one or more parameters associated with the user profile, a schedule of the one or more users, activities of daily living ("ADL") associated with each user/user profile, one or more contextual factors.

In one aspect, the intelligent teleconference service 410 may assist in providing access to and/or assist in performing one or more various types of data, services and/or resources. The intelligent teleconference service 410 may provide a device identification and tracking component 412, a user identification (ID) and tracking component 414, a prioritizing component 416, a machine learning component 418, a connection/disconnection component 420, and/or the database/knowledge domain 430.

In one aspect, the IoT device 470 may communicate with the device 460 using one or more communication connections such as, for example, a Wi-Fi Internet connection 475 or other wireless communication connections. The device 460 and the IoT device 470 may communicate with the cloud computing environment 402 via the network 450 to send a unique device identification (ID) sent from the device 460 and/or an IoT identification (ID) that was received from the IoT device 470. That is, the device 460 and/or the IoT device 470 may log into the cloud computing environment 402, for the user 480 and/or user 485, using various login credentials, which can include a user identification (ID), a unique device ID of the device 460 and/or the IoT device ID received from the IoT device 470. The unique device ID of the device 460 and/or the ID of the IoT device may be stored, maintained, and/or received in a device identification and tracking component 412 of the intelligent teleconference service 410. The user ID may be stored, maintained, and/or received in a user identification and tracking component 414 of the intelligent teleconference service 410.

That is, the user 480 and/or 485 can provide voice commands to the IoT device 470 and/or device 460 to provide other biometric data, which may be stored and/or retrieved at later times as the biometric ID data for authenticating the IoT device 470 and/or device 460 and also the users 480 and/or 485.

The device identification and tracking component 412 may define, establish, and track a physical presence of the one or more users (e.g., users 480 or 485) within a defined proximity with the device 460 and/or IoT device 470. The device identification and tracking component 412 may define, establish, and track a virtual presence of the one or more users 480 and/or 485 associated with the device 460 and/or IoT device 470.

The user ID and tracking component 414 may establish a physical or virtual awareness of users 480 and/or 485. Moreover, the user ID and tracking component 414 may also identify and authorize the user 480 and/or 485 for accessing, using, or executing a command in the cloud computing environment 402 for accessing data/content, services and/or resources. For example, the user 480 may communicate voice commands to the IoT device 470. The cloud computing environment, in association with the IoT device 470 may identify the user 480 as the speaker (e.g., "speaker identification") or voice of the issued command. For example, the cloud computing environment 402 and/or the user ID and tracking component 414 can identify the user 480 speaking when one or more persons connect from each customer's own device (laptop, tablet, phone) such as, for example, device 460 and/or via the IoT device 470. By establishing the authenticated identity, which may include the identification for each user, such as user 480, the cloud computing environment 402, the user ID and tracking component 414, and/or the device 460/IoT device 470 (each having the authorized identity) identify which user issued a voice command, such as to an IoT device.

In one aspect, the device identification and tracking component 412 and/or the user ID and tracking component 414 may monitor the schedule of the one or more users (e.g., users 480 or 485), each of the ADLs of the user, and the one or more contextual factors using a machine learning operation of machine learning component 418, one or more IoT computing devices (e.g., device 460/IoT device 470), or a combination thereof.

The connection/disconnection component 420 may cognitively initiate or terminate a communication connection for a conference call session with one or more users according to one or more parameters associated with a user profile, a schedule of the one or more users, activities of daily living ("ADL"), one or more contextual factors, or a combination thereof. It should be noted that a conference call, for example, may include multiples users at one or more physical or virtual locations that may use IoT device 470 and/or 460. For example, the connection/disconnection component 420 may automatically retrieve, locate, and/or identify a dial-in number, a password, if required, associated with the dial-in number from the schedule of the one or more users for initiating the communication connection.

In one aspect, the connection/disconnection component 420 may set a UE (e.g., device 460 and/or IoT device 470) of the one or more users (e.g., users 480 or 485) to a silent mode upon initiating the communication connection. Alternatively, the connection/disconnection component 420 may signal the one or more IoT computing devices (e.g., device 460/IoT device 470) to enter a silent mode upon initiating the communication connection.

In association with the connection/disconnection component 420, the prioritizing component 416 may determine a priority level of one or more events related to the user profile, the schedule of the one or more users, the ADLS of the one or more, the one or more contextual factors, or a combination thereof for cognitively initiating the communication connection for the conference call session. A priority level of the one or more events may be compared with a priority level of the conference call session.

The connection/disconnection component 420 may initiate the communication connection for the conference call session upon determining a priority level of one or more events is less than a priority level of the conference call session. Alternatively, the connection/disconnection component 420 may delay, for a selected period of time, initiating the communication connection for the conference call session upon determining the priority level of one or more events is greater than the priority level of the conference call session.

The connection/disconnection component 420 may automatically terminate the communication connection according to an identified user of the one or more users (e.g., users 480 and/or 485) leaving the conference call session. The connection/disconnection component 420 may also automatically terminate the communication connection after a time period of silence of the conference call session has exceeded a threshold, identification of one or more keywords, voice recognition data of the one or more users identified during the conference call, or a combination thereof.

In an additional aspect, the connection/disconnection component 420 may monitor the schedule and meetings of one or more users (e.g., users 480 and/or 485). The prioritizing component 416, in association with the connection/disconnection component 420, may determine the priority of the one or more conference calls on a schedule and/or related to the meetings based on one or more communications (e.g., emails, text messages, telephone calls, etc.). Based on a set priority of call-in (or set call-in priority), the connection/disconnection component 420 may connect/dial into a conference call by fetching a number (and/or password) from a calendar invite such as, for example, extracting a contact number from a contact associated with the calendar. The set priority of call-in may be the priority of a respective call based on a calendar entry, how important is the meeting based on members on the call, an agenda of discussion, and/or previous discussions with the same members. Hence, a priority may be set for a respective call (e.g., call with a friend may have lower priority than a call with a manager having a higher priority). The priority may be defined as a percentage, a value within a range of values, and/or a value above or below a priority threshold.

After fetching the number from the contacts or the calendar, a user (e.g., users 480 and/or 485) may be enabled to join in/connect to the conference call. In one aspect, the conference call, and/or devices 460 and/or 470, may be initially set to a silent mode (e.g., placed on mute) until a time of the meeting is scheduled to start. The conference call may exit the silent mode (e.g., un-muted) upon detecting one or more users (e.g., users 480 and/or 485) start discussing one or more topics, events, purposes, and/or one or more detected keywords for which the call has been initiated. In one aspect, various technologies may be integrated with speakers which can detect the user is talking, but the call is on mute and the users may be alerted.

When the conference call is ended, the connection/disconnection component 420 may detect, determine, and/or recognize that no communication is occurring on one or more devices (e.g., device 460 and/or 470) such as, for example, when no person is talking on the phone and the user has forgotten to turn off the phone. A timer may be used to monitor and maintain a duration of the conference call (e.g., a start time and an end time) for one or more scheduled conference calls/events. Upon expiration of a predetermined amount of time such as, a period of detected silence, the connection/disconnection component 420 may determine users 480 and/or 485 have failed to respond and may also determine a physical or virtual presence and/or a physical or virtual absence of the users 480 and/or 485. For example, the connection/disconnection component 420 may determine the users 480 and/or 485 are physically absent from the conference call. More specifically, the connection/disconnection component 420 may determine a geolocation of the user 480 and/or 485 and determine that the users 480 and/or 485 are outside a defined physical radius 490 for the conference call according to the geolocation of the user 485. The connection/disconnection component 420 may also detect that device 460 is active and linked to the user 485.

In one aspect, parameters involved for determining the time when to terminate, disconnect, and/or hang up the conversation may include one or more of the following. The parameters may include checking a duration of a call from the meeting details. Also, a parameter may include a determining if users (e.g., users 480 and/or 485) are still discussing the conference call. In one aspect, a determine may be performed to determine if the users are still active on the call and communicating on the conference call such as, for example, using on natural language processing ("NLP") keyword extraction and feature extraction (e.g., Mel Frequency Cepstral Coefficients "MFCC") for feature extraction of the speech and NLP for keyword extraction to determine the relevance of the conversation after the scheduled time of the conference call has completed/expired. Moreover, the parameters may include a threshold of silence (e.g., period of silence) after the scheduled conference call duration has ended or scheduled to be over such as, for example, 2 minutes after the call was scheduled to end. Once these parameters are evaluated and satisfied to exceed a specific threshold factor, the connection/disconnection component 420 may disconnect and terminated.

The machine learning component 418 may learn, identity, behavior, activity, contextual factors, and/or the parameters. Also, machine learning component 418 may identity the presence or absence of a user (e.g., user 480 and/or 485). In one aspect, the machine learning component 418 may extract one or more features for feature extraction of the speech and NLP for keyword extraction to determine the relevance of the conversation after the scheduled time of the conference call has completed/expired. Additionally, the machine learning component 418 may learn a call is scheduled on a calendar of a user such as, for example, uses 480 and/or 485. The machine learning component 418 may then issue a notification to user 485, which may state "A conference call is now starting. No other priority events are detected. You are now placed into the call. No action is required on your part." Using NLP and/or an alternative AI operation, the one or more communications (e.g., an audio or video communication of the conference call) of the event may be processed. That is, the machine learning component 418 may employ one or more cognitive applications/artificial intelligence ("AI") services along with NLP and/or machine learning. These AI services may include, without limitation, instances of IBM® Watson® such as Watson® Alchemy Language. (IBM® and Watson® are trademarks of International Business Machines Corporation.)

In one aspect, the machine learning component 418 may also convert image or video data of the one or more communications to text data. The machine learning component 418 may also convert audio data of the one or more communications to text data. In an alternative embodiment, each of the active and linked devices associated with the user may be prioritized according to one or more parameters, policies, rules, and/or preferences for receiving the notification.

In one aspect, the machine learning component 418 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
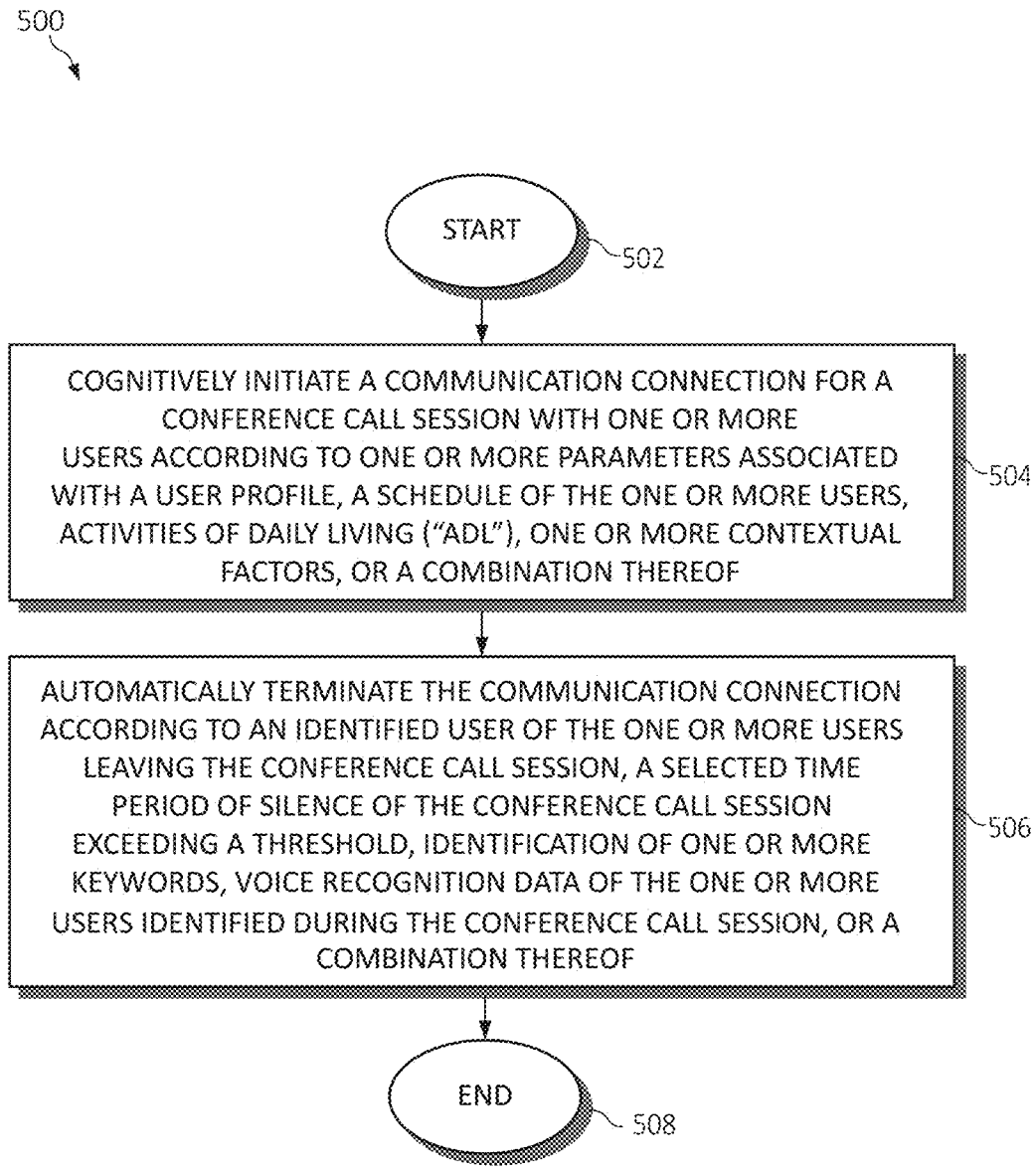
FIG. 5 is a flowchart diagram depicting an exemplary method for implementing intelligent teleconference operations during an event in a computing environment by a processor, again in which aspects of the present invention may be realized.

Turning now to FIG. 5, a method 500 for intelligent teleconference operations for an event (e.g., conference call) in an Internet of Things (IoT) computing environment is depicted, in which various aspects of the illustrated embodiments may be implemented. The functionality 500 may be implemented as a method executed as instructions on a machine, where the instructions are included on at least one computer readable medium or on a non-transitory machine-readable storage medium. The functionality 500 may start in block 502.

A communication connection for a conference call session may be cognitively initiated with one or more users according to one or more parameters associated with a user profile, a schedule of the one or more users, activities of daily living ("ADL"), one or more contextual factors, or a combination thereof, as in block 504. The communication connection may be cognitively terminated according to an identified user of the one or more users leaving the conference call session, a selected time period of silence of the conference call session exceeding a threshold, identification of one or more keywords, voice recognition data of the one or more users identified during the conference call session, or a combination thereof, as in block 506. The functionality 500 may end in block 508.

Figure 6A:
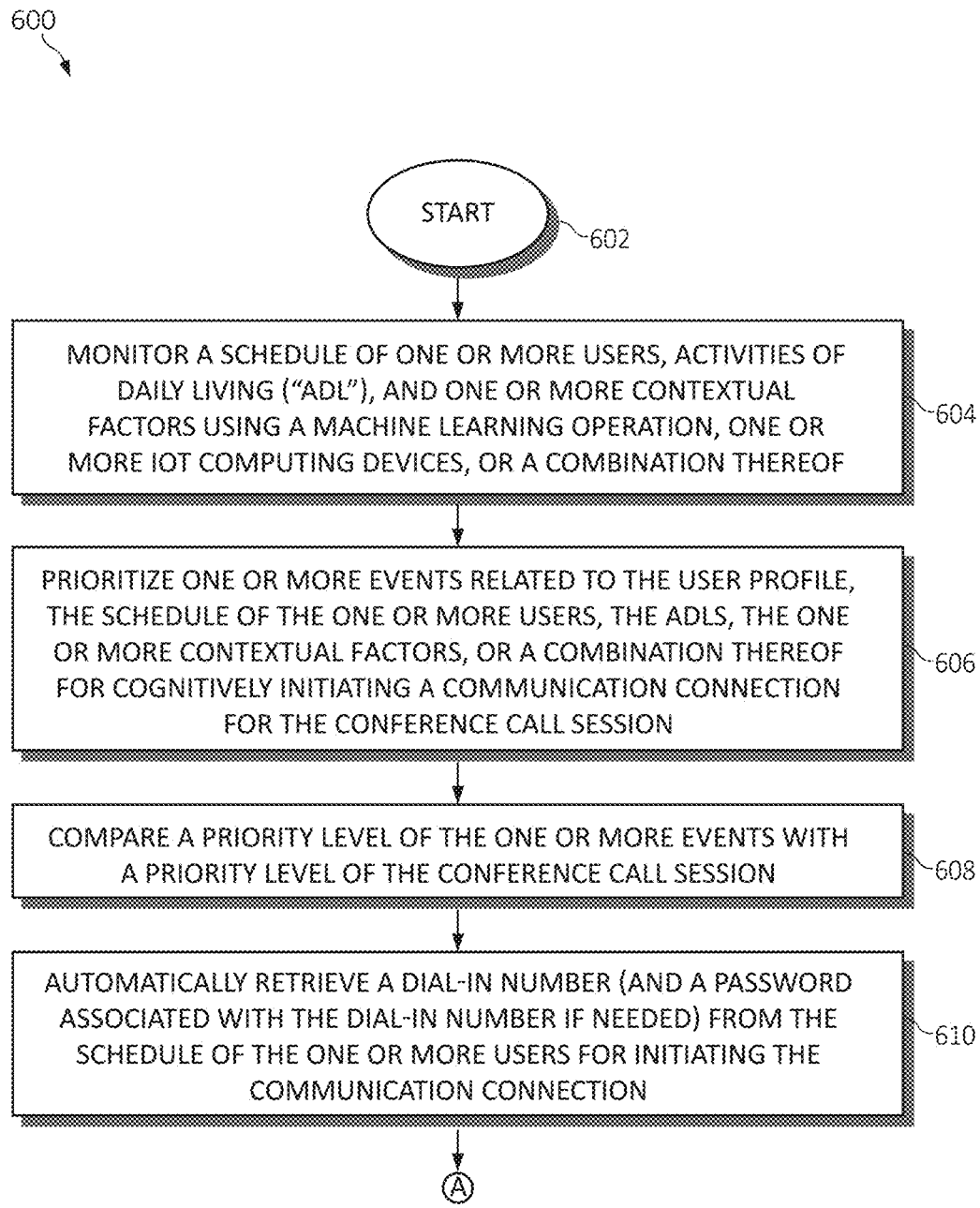
FIGS. 6A-6B is an additional flowchart diagram depicting an additional exemplary method for intelligent teleconference operations during an event in an Internet of Things (IoT) computing environment by a processor, again in which aspects of the present invention may be realized.
Figure 6B:
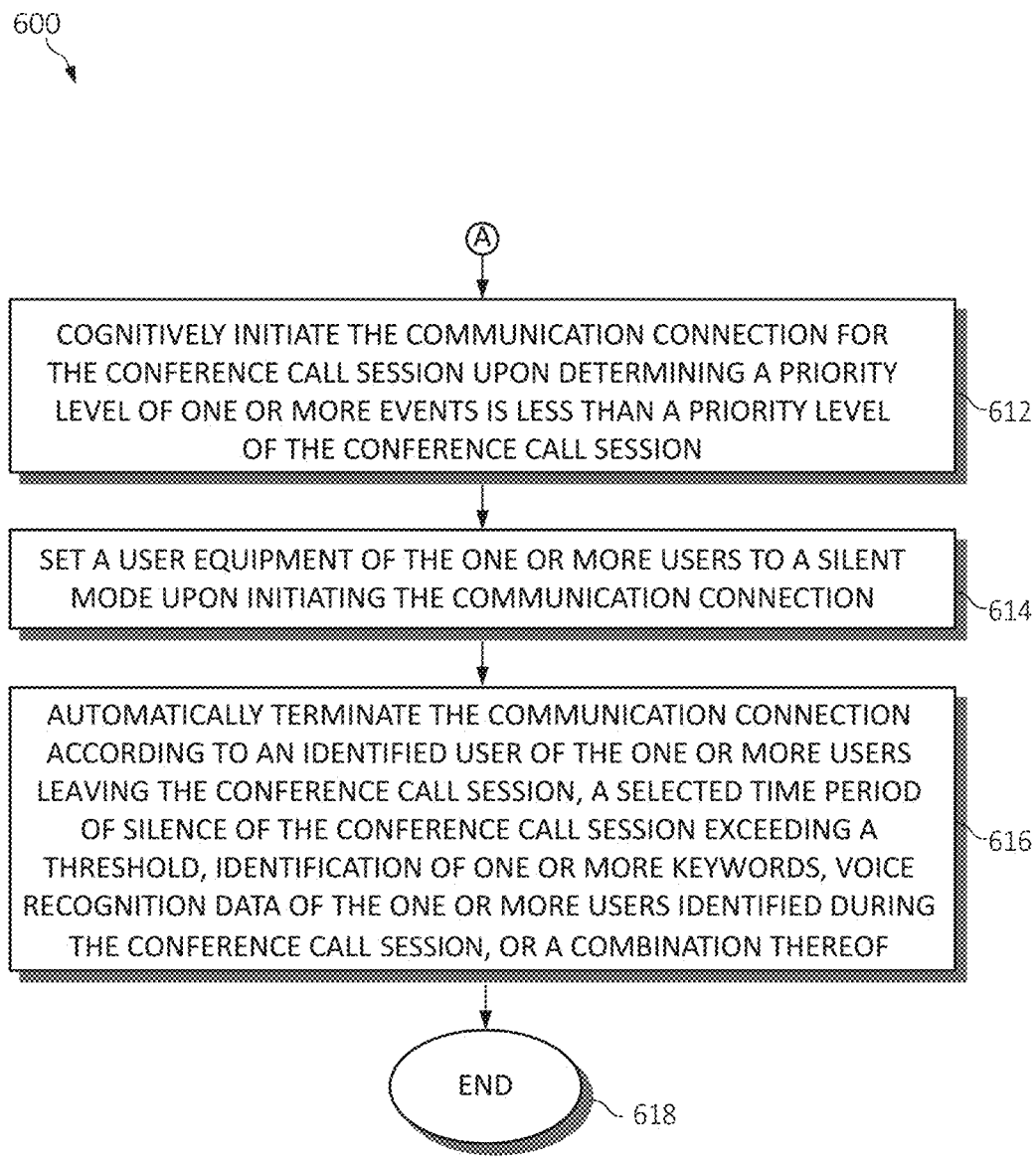

Turning now to FIGS. 6A-B, a method 600 for intelligent teleconference operations in an Internet of Things (IoT) computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

One or more schedules, activities of daily living ("ADL"), one or more contextual factors of the one or more users may be monitored using a machine learning operation, one or more IoT computing devices, or a combination thereof, as in block 604. A priority level of one or more events related to the user profile, the schedule of the one or more users, the ADLS, the one or more contextual factors, or a combination thereof may be determined for cognitively initiating the communication connection for the conference call session, as in block 606. A priority level of the one or more events may be compared with a priority level of the conference call session, as in block 608. A dial-in number (and/or a password associated with the dial-in number) may be retrieved from the one or more schedules of the one or more users for initiating the communication connection, as in block 610.

The communication connection may be cognitively initiated for the conference call session upon determining a priority level of one or more events is less than a priority level of the conference call session, as in block 612. A user equipment (UE) of the one or more users may be set to a silent mode upon initiating the communication connection, as in block 614. The communication connection may be terminated according to an identified user of the one or more users leaving the conference call session, a selected time period of silence of the conference call session exceeding a threshold, identification of one or more keywords, voice recognition data of the one or more users identified during the conference call session, or a combination thereof, as in block 616. The functionality 600 may end in block 608.

In one aspect, in conjunction with and/or as part of at least one block of FIGS. 5-6, the operations of methods 500 and 600 may include each of the following. The operations of methods 500 and 600 may detect a physical presence, a physical absence, a virtual presence, a virtual absence, or a combination thereof for one or more users for the event, wherein the event is a conference call including the plurality of users at one or more physical or virtual locations. The operations of methods 500 and 600 may extract one or more features of speech and/or NLP for keyword extraction to determine the relevance of the conversation after the scheduled time of the conference call has completed/expired.

The operations of methods 500 and 600 may automatically terminate the communication connection according to an identified user of the one or more users leaving the conference call session, a selected time period of silence of the conference call session exceeding a threshold, identification of one or more keywords, voice recognition data of the one or more users identified during the conference call, or a combination thereof. Also, a schedule of the one or more users, the ADLs of each user, and one or more contextual factors may be monitored using a machine learning operation, one or more IoT computing devices, or a combination thereof.

The operations of methods 500 and 600 may automatically retrieve a dial-in number, a password associated with the dial-in number from the schedule of the one or more users for initiating the communication connection, and/or set a user equipment of the one or more users to a silent mode upon initiating the communication connection. The operations of methods 500 and 600 may determine 1) a number of users that have joined or disconnected from the conference call session, 2) a priority level of one or more events related to the user profile, the schedule of the one or more users, 3) one or more ADLs of each user, the one or more contextual factors associated with each of the user, or a combination thereof for cognitively initiating the communication connection for the conference call session.

Also, a priority level of the one or more events may be compared with a priority level of the conference call session. The operations of methods 500 and 600 may initiate the communication connection for the conference call session upon determining a priority level of one or more events is less than a priority level of the conference call session, and/or delay the initiating of the communication connection for the conference call session upon determining the priority level of one or more events is greater than the priority level of the conference call session.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent teleconference operations in an Internet of Things (IoT) computing environment, comprising:
  cognitively initiating or terminating a communication connection for a conference call session with one or more users according to one or more parameters associated with a user profile, a schedule of the one or more users, activities of daily living ("ADLs"), one or more contextual factors, or a combination thereof, wherein cognitively initiating the communication connection for the conference call session includes:
    initiating the communication connection for the conference call session upon determining a priority level of one or more events the one or more users are currently engaged in is less than a priority level of the conference call session, wherein the one or more events are identified by observing spatiotemporal characteristics of a current physical environment surrounding the one or more users; and
    delaying the initiating of the communication connection for the conference call session upon determining the priority level of one or more events is greater than the priority level of the conference call session;
automatically setting a user equipment of the one or more users to a silent mode upon initiating the communication connection to the conference call session, wherein the silent mode of the user equipment is automatically exited upon detecting the one or more users begin discussing information for which the conference call has been initiated, once the communication connection to the conference call has been established;
detecting an occurrence of one or more of a plurality of contextual factors associated with terminating the communication connection, wherein at least one of the plurality of contextual factors includes determining, from informational details of the conference call session, that a scheduled duration of the conference call session has elapsed; and
responsive to determining the scheduled duration of the conference call session has elapsed, automatically terminating the communication connection upon identifying that a relevance of discussion of the one or more users subsequent to the scheduled duration, with respect to the information for which the conference call had been initiated, does not meet a predetermined relevance threshold.

2. The method of claim 1, wherein the plurality of contextual factors associated with terminating the communication connection further include determining an identified user of the one or more users leaving the conference call session, a selected time period of silence of the conference call session exceeding a threshold, identification of one or more keywords, voice recognition data of the one or more users identified during the conference call session, or a combination thereof.

3. The method of claim 1, further including monitoring the schedule of the one or more users, the ADLs, and the one or more contextual factors using a machine learning operation, one or more IoT computing devices, or a combination thereof.

4. The method of claim 1, further including automatically retrieving a dial-in number, a password associated with the dial-in number from the schedule of the one or more users for initiating the communication connection.

5. The method of claim 1, further including determining the one or more users have joined or disconnected from the conference call session.

6. The method of claim 1, further including:
determining the priority level of the one or more events by examining the user profile, the schedule of the one or more users, the ADLs, the one or more contextual factors, or a combination thereof for cognitively initiating the communication connection for the conference call session; and
comparing the priority level of the one or more events with the priority level of the conference call session.

7. A system for intelligent teleconference operations in an Internet of Things (IoT) computing environment, comprising:
one or more computers with executable instructions that when executed cause the system to:
cognitively initiate or terminate a communication connection for a conference call session with one or more users according to one or more parameters associated with a user profile, a schedule of the one or more users, activities of daily living ("ADLs"), one or more contextual factors, or a combination thereof, wherein cognitively initiating the communication connection for the conference call session includes:
initiating the communication connection for the conference call session upon determining a priority level of one or more events the one or more users are currently engaged in is less than a priority level of the conference call session, wherein the one or more events are identified by observing spatiotemporal characteristics of a current physical environment surrounding the one or more users; and
delaying the initiating of the communication connection for the conference call session upon determining the priority level of one or more events is greater than the priority level of the conference call session;
automatically set a user equipment of the one or more users to a silent mode upon initiating the communication connection to the conference call session, wherein the silent mode of the user equipment is automatically exited upon detecting the one or more users begin discussing information for which the conference call has been initiated, once the communication connection to the conference call has been established;
detect an occurrence of one or more of a plurality of contextual factors associated with terminating the communication connection, wherein at least one of the plurality of contextual factors includes determining, from informational details of the conference call session, that a scheduled duration of the conference call session has elapsed; and
responsive to determining the scheduled duration of the conference call session has elapsed, automatically terminate the communication connection upon identifying that a relevance of discussion of the one or more users subsequent to the scheduled duration, with respect to the information for which the conference call had been initiated, does not meet a predetermined relevance threshold.

8. The system of claim 7, wherein the plurality of contextual factors associated with terminating the communication connection further include determining an identified user of the one or more users leaving the conference call session, a selected time period of silence of the conference call session exceeding a threshold, identification of one or more keywords, voice recognition data of the one or more users identified during the conference call session, or a combination thereof.

9. The system of claim 7, wherein the executable instructions further monitor the schedule of the one or more users, the ADLs, and the one or more contextual factors using a machine learning operation, one or more IoT computing devices, or a combination thereof.

10. The system of claim 7, wherein the executable instructions further automatically retrieve a dial-in number, a password associated with the dial-in number from the schedule of the one or more users for initiating the communication connection.

11. The system of claim 7, wherein the executable instructions further determine the one or more users have joined or disconnected from the conference call session.

12. The system of claim 7, wherein the executable instructions further:
determine the priority level of the one or more events by examining the user profile, the schedule of the one or more users, the ADLs, the one or more contextual factors, or a combination thereof for cognitively initiating the communication connection for the conference call session; and compare the priority level of the one or more events with the priority level of the conference call session.

13. A computer program product for intelligent teleconference operations in an Internet of Things (IoT) computing environment by a processor, the computer program product comprising a non-transitory computer-readable storage medium having computer-readable program code portions stored therein, the computer-readable program code portions comprising:

an executable portion that cognitively initiates or terminates a communication connection for a conference call session with one or more users according to one or more parameters associated with a user profile, a schedule of the one or more users, activities of daily living ("ADLs"), one or more contextual factors, or a combination thereof, wherein cognitively initiating the communication connection for the conference call session includes:

initiating the communication connection for the conference call session upon determining a priority level of one or more events the one or more users are currently engaged in is less than a priority level of the conference call session, wherein the one or more events are identified by observing spatiotemporal characteristics of a current physical environment surrounding the one or more users; and delaying the initiating of the communication connection for the conference call session upon determining the priority level of one or more events is greater than the priority level of the conference call session;

an executable portion that automatically sets a user equipment of the one or more users to a silent mode upon initiating the communication connection to the conference call session, wherein the silent mode of the user equipment is automatically exited upon detecting the one or more users begin discussing information for which the conference call has been initiated, once the communication connection to the conference call has been established;

an executable portion that detects an occurrence of one or more of a plurality of contextual factors associated with terminating the communication connection, wherein at least one of the plurality of contextual factors includes determining, from informational details of the conference call session, that a scheduled duration of the conference call session has elapsed; and an executable portion that, responsive to determining the scheduled duration of the conference call session has elapsed, automatically terminates the communication connection upon identifying that a relevance of discussion of the one or more users subsequent to the scheduled duration, with respect to the information for which the conference call had been initiated, does not meet a predetermined relevance threshold.

14. The computer program product of claim 13, wherein the plurality of contextual factors associated with terminating the communication connection further include determining an identified user of the one or more users leaving the conference call session, a selected time period of silence of the conference call session exceeding a threshold, identification of one or more keywords, voice recognition data of the one or more users identified during the conference call session, or a combination thereof.

15. The computer program product of claim 13, further including an executable portion that monitors the schedule of the one or more users, the ADLs, and the one or more contextual factors using a machine learning operation, one or more IoT computing devices, or a combination thereof.

16. The computer program product of claim 13, further including an executable portion that:

automatically retrieves a dial-in number, a password associated with the dial-in number from the schedule of the one or more users for initiating the communication connection; and determines the one or more users have joined or disconnected from the conference call session.

17. The computer program product of claim 13, further including an executable portion that:

determines the priority level of the one or more events by examining the user profile, the schedule of the one or more users, the ADLs, the one or more contextual factors, or a combination thereof for cognitively initiating the communication connection for the conference call session; and compares the priority level of the one or more events with the priority level of the conference call session.

* * * * *